(12) United States Patent
Sousa et al.

(10) Patent No.: US 11,349,728 B2
(45) Date of Patent: May 31, 2022

(54) DYNAMIC RESOURCE ALLOCATION BASED ON FINGERPRINT EXTRACTION OF WORKLOAD TELEMETRY DATA

(71) Applicant: EMC IP Holding Company LLC, Hopkinton, MA (US)

(72) Inventors: Eduardo Vera Sousa, Rio de Janeiro (BR); Tiago Salviano Calmon, Rio de Janeiro (BR); Vinicius Michel Gottin, Rio de Janeiro (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/832,031

(22) Filed: Mar. 27, 2020

(65) Prior Publication Data

US 2021/0306232 A1    Sep. 30, 2021

(51) Int. Cl.
| | |
|---|---|
| *H04L 12/24* | (2006.01) |
| *H04L 12/26* | (2006.01) |
| *G06F 16/2455* | (2019.01) |
| *G06N 3/08* | (2006.01) |
| *H04L 41/5041* | (2022.01) |
| *H04L 43/04* | (2022.01) |
| *H04L 43/0817* | (2022.01) |
| *H04L 41/5019* | (2022.01) |
| *G06N 3/04* | (2006.01) |

(52) U.S. Cl.
CPC .... *H04L 41/5041* (2013.01); *G06F 16/24558* (2019.01); *G06N 3/088* (2013.01); *H04L 41/5019* (2013.01); *H04L 43/04* (2013.01); *H04L 43/0817* (2013.01); *G06N 3/04* (2013.01)

(58) Field of Classification Search
CPC ............ H04L 41/5041; H04L 43/0817; H04L 41/5019; H04L 43/04; G06N 3/088; G06N 3/04; G06F 16/24558
See application file for complete search history.

(56) References Cited

U.S. PATENT DOCUMENTS

| | | | |
|---|---|---|---|
| 2014/0237550 A1* | 8/2014 | Anderson | H04L 63/14 726/3 |
| 2015/0007173 A1* | 1/2015 | Ionescu | G06F 9/45533 718/1 |
| 2018/0246558 A1* | 8/2018 | Morad | G06F 1/329 |
| 2019/0104022 A1* | 4/2019 | Power | H04L 41/0896 |
| 2019/0319977 A1* | 10/2019 | Gottschlich | H04L 63/1408 |
| 2020/0167258 A1* | 5/2020 | Chattopadhyay | G06F 9/5011 |

\* cited by examiner

*Primary Examiner* — Nicholas R Taylor
*Assistant Examiner* — Sanjoy Roy
(74) *Attorney, Agent, or Firm* — Workman Nydegger

(57) ABSTRACT

Resource allocation to workloads is disclosed. Telemetry data associated with existing or previously executed workloads is stored and used to develop models. Telemetry data from new workloads are collected and, using the models, a fingerprint is extracted and compared to the fingerprints of previous workloads. This allows the initial allocation of resources to the new workload to be improved and aids in resource allocation convergence.

20 Claims, 8 Drawing Sheets

DYNAMIC RESOURCE ALLOCATION BASED ON FINGERPRINT EXTRACTION OF WORKLOAD TELEMETRY DATA

FIELD OF THE INVENTION

Embodiments of the present invention generally relate to allocating resources. More particularly, at least some embodiments of the invention relate to systems, hardware, software, computer-readable media, and methods for allocating resources to workloads based on fingerprints of workload telemetry data.

BACKGROUND

Cloud computing provides many benefits to users. These benefits include pay-per-use computation at the customer's side and resource sharing at the provider's side. Using virtualization (e.g., virtual machines, container technology), pools of computing resources can be abstracted. Abstracting resources allows computing resources to be better tailored to the needs of customers.

In fact, it is possible to offer computing resources to customers without the explicit necessity of the customer knowing which infrastructure is running the customer's code. This is achieved in a PaaS (Platform as a Service) paradigm and the Faas (Function as a Service, serverless computing) paradigm. In these paradigms, there is usually an agreement between the customer and the provider regarding the quality of service (QoS). These agreements are often referred to as service level agreements (SLAs).

SLAs establish agreements regarding various metrics such as response time, execution time, uptime percentage, and the like. The terms of the SLAs between a customer and a provider are usually agreed upon prior to providing the service through reference target metrics values. Providers are expected to comply with these target metrics as set forth in the SLAs in order to avoid contractual penalties. Failing to meet these target metrics may also diminish the perceived trust of the provider by the customer.

In order to comply with the SLAs, a provider of computing resources may dedicate a large amount of resources to each customer. Dedicating a large amount of resources to each workload usually ensures that the provider will comply with all of the SLAs. However, this approach incurs an unacceptable inefficiency. For example, applications can be bound by different resources, which may be unknown at the time the application is deployed. In addition, the amount of spare resources dictates how many workloads or jobs can be run in parallel. Simply dedicating a large amount of resources to each customer workload is contrary to the provider's interest in optimizing the resource allocation to a specific workload. In other words, this simplistic approach tends to over allocate resources at the provider's expense and is inefficient.

An potential solution to simply allocating a large or fixed amount of resources is to dynamically allocate resources. However, resource allocation problems may occur. For example, newly deployed applications require resources that allocating resources to a new application may impact the resources required by other workloads. In other words, newly deployed applications may interfere with running workloads and may impact the ability of the provider to comply with their SLAs. Workloads that finish or fail during the execution of other workloads may also cause interference. The challenge is how to dynamically allocate resources to minimize or avoid interference.

More generally, a characteristic of infrastructure provision is the variability in perceived demand. Because service providers are willing to charge an amount per computation usage, and because these providers have many customers, it is natural for the demand to vary within different time frames. The demand can vary on a daily basis, a weekly basis and even a monthly based.

This variation in demand also imposes several challenges. The intent of the provider is to serve each customer in accordance with the corresponding level defined in the relevant SLA. As previously stated, the metrics and performance levels of the SLA are set before service is provided to the customer. As a result, the provider is required by contract to comply with the SLAs that the provider has entered into regardless of what happens during execution. The provider may be subject to disrupting events such as sharp demand peaks, malfunctioning recourse, or unrealistic contracts. If the resources are not allocated efficiently, the result is to infringe the SLA or waste resources.

In other words, complying with all of the SLAs made with customers is challenging. Even though some knowledge of the future workloads exists and there are some ways to predict demand, there are always errors in these estimations and predictions. This may make the task of complying with all of the SLAs very difficult.

Further, when allocating resources, the initial estimation of resources needed by a workload is a hard task. Random estimations may lead to wasted resources or SLA infringements. Although SLA infringements may be more harmful, wasted resources or the over allocation of resources can lead to higher interference and wrong resource allocations for concurrent workloads.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
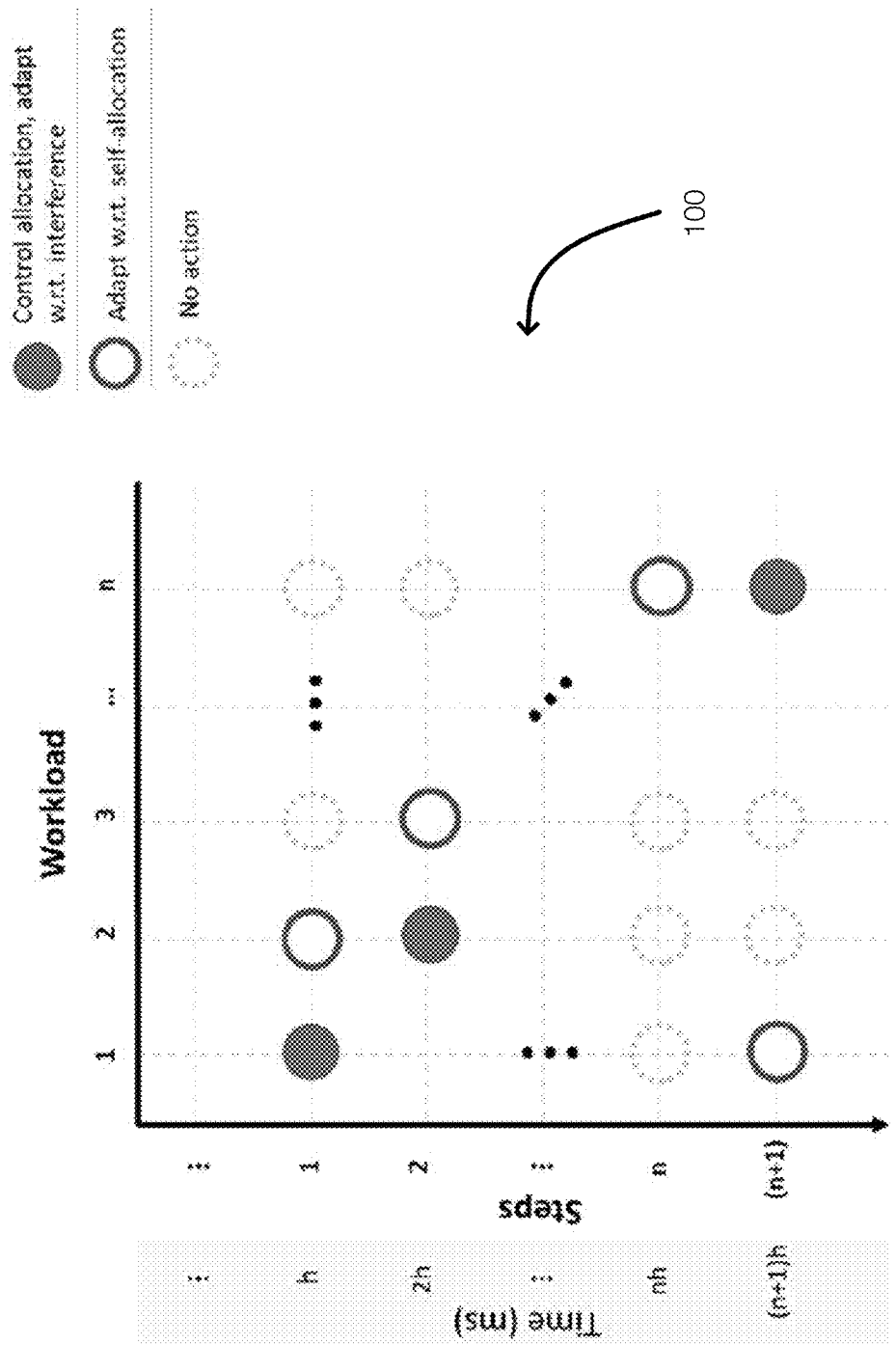
FIG. 1 discloses aspects of an example of a control and resource adaptation schema configured to allocate resources.

Embodiments of the present invention generally relate to resource allocation. More particularly, at least some embodiments of the invention relate to systems, hardware, software, computer-readable media, and methods for dynamically allocating resources based on workload fingerprints.

As previously stated, executing workloads (or jobs) while respecting individual Service Level Agreements (SLAs) poses several challenges. Adapting (reallocating) the computing resources to workloads to appropriately satisfy the SLAs requires handling several factors such as variations in the computing environment, demand peaks and hardware malfunctions. Even in static allocation strategies, under-allocation may result in an SLA infringement while over-allocation is inefficient and limits the number of concurrently executed workloads.

Embodiments of the invention relate to determining an initial resource allocation for a workload based on fingerprints extracted from models built over telemetry data of past executions. Complex models are generated when possible and the most appropriate models are selected. The fingerprints generated from the model (using for example new workload telemetry data as input) can then be compared to other fingerprints generated by inputting previously telemetry data into the same models. When a sufficiently close match is found, the resources allocated to the workload may correspond to the resource allocation associated with the matching or sufficiently matching fingerprint. This approach synergizes with dynamic resource allocation mechanisms by diminishing the variations in the interference of one workload with another and allowing for quicker resource convergence.

Embodiments of the invention relate to a method for calculating an initial allocation for a generic workload based on previous allocations for heterogeneous environments, i.e., environments that comprises different workloads types. Examples of workload types include, but are not limited to, neural network training and computer vision workloads.

In one example, the dynamics that relate allocations with SLA metrics can be defined as follows:

$$s_i(k) = s_i(k-1) + b_{1i}\Delta u_i(k) - b_{2i}\Delta u_{j \ne i} u_i(k) \quad (1)$$

In this example, $s_i(k)$ is the SLA metric of interest in step k, $b_{1i}$, is a term that relates the self-allocation of workload i with respect to the target SLA metric, $b_{2i}$, is a term that accounts for the interference of another workload's allocations with respect to the target SLA metric, and $u_i(k)$ is the amount of a particular resource allocated at step k.

Even if this relationship in equation (1) does not perfectly mimic reality, this relationship is adaptable to a wide range of workloads. Assuming that workloads share resources, an automatic controller may control multiple iterative workloads. In one example, the automatic controller may have no prior knowledge about the workloads and operates to stabilize the workloads with respect to the relevant SLA metrics.

The controller that is configured to dynamically control the resources or that is dynamically configured to reallocate resources may receive, as input:

the current SLA metric measured at the time of the control;

the previously measured SLA metric; and the amount of CPU spent by all the other concurrent workloads.

In this example, all of the workloads are controlled and adapted once per cycle. This is achieved by dividing the control process into n steps, where n is the number of monitored/controlled workloads at a moment in time. In this example, (n−1) steps are used to collect enough data to adapt the self-allocation parameter $b_{1i}$. The remaining step is used to adapt the interference parameter $b_{2i}$, and apply the control with both learned parameters.

FIG. 1 illustrates a cycle of the alternate control/adaptation schema. The graph 100 illustrates that an adaptation engine adapts with respect to self-allocation n−1 steps after it changed its allocation. One step after that, the adaptation engine changes the allocation of this workload and the cycle restarts. The steps are sampled every h milliseconds in this example of FIG. 1.

This leads to various advantages, including different timespans for learning interference and self-allocation parameters, which leads to better control of the resource allocations. In this example, the steps are sampled every h milliseconds. As a result, n×h milliseconds pass before a workload performs control allocation in this cyclic approach.

In FIG. 1, for example, the resource allocation of workload 1 is controlled in step 1 and then again only at step (n+2) instead of at every step. This impacts the convergence time of workload 1 in proportion to the number of competing workloads n. The convergence may be defined, by way of example only, as being close enough to a set-point, e.g., a step when iteration time reaches set-point within an acceptable percentage. The set point can also be defined as a target execution time of a workload. Convergence refers to the behavior of the monitored execution times to get closer to the set point. In this sense, a faster convergence is good because less time is spent performing bad allocations to the workload. In other words, resources are allocated such that a workload executes within the target execution time. Embodiments of the invention improve the ability to meet the target execution time by providing an initial allocation of resources that minimizes interference, provides the workload with sufficient resources to avoid SLA infringement, and allows the workload to converge more quickly.

Returning to workload 1 in FIG. 1, the impact of this delayed and reduced number of actuations is reasonably small for a small number of concurrent workloads. However, this approach may suffer with scalability at least because the number of control actions performed in a workload is proportional to the number of workloads in a cycle, assuming a fixed sampling rate.

The delay in the convergence time caused by additional workloads can be mitigated using an early-convergence detection mechanism. The early-convergence mechanism, which may be included in or performed by the controller, receives the metrics of each workload at each iteration and ranks the metrics at the end of a cycle. This allows the controller to decide which workloads will be controlled in the next cycle.

The ranking algorithm works by categorizing each workload in terms of closeness to the set-point. In one example, the modulus of relative error is used as a ranking metric. This error may be calculated using the following equation:

$$e_{s_i} = \frac{|s_i(k) - r_i(k)|}{r_i(k)} \quad (2)$$

More specifically, each workload presents an error metric at the end of a cycle. The error can be compared to a predefined or predetermined convergence threshold. The threshold may be defined by the operator and represents the tolerance for which the workload is assumed to be converged. The convergence often relates to the allocated resources and, by way of example only, may represent when the resources allocated to the corresponding resource is sufficient or within a threshold. Workloads whose error is smaller than the threshold are considered converged. Converged workloads are removed from the control cycle, similarly to finished workloads.

A converged workload might not remain converged until termination for a variety of reasons such as, by way of example only, natural oscillation of times, interference due to new workloads, heavy adjustment in other running workloads allocations, and the like. As a result, the convergence is checked for all workloads (monitored and controlled) at the end of each cycle. If a workload in the monitored list has errors above the predefined threshold, the workload is re-inserted back into the control cycle.

Embodiments of the invention further control resource allocations by estimating an initial resource allocation for the dynamic resource controller. Embodiments of the invention consider fingerprints obtained or generated from telemetry data of previous workload executions. Using an autoencoder model, the telemetry data from previous executions of a workload are compressed or encoded. This compressed or encoded version or representation of the telemetry data behaves like a fingerprint of the workload. Further, fingerprints can be stored and associated with their respective resource allocations. In one example, fingerprints of converged workloads are stored. Alternatively, the initial resource allocations can be adjusted based on their converged allocations.

Next, when a new workload is present, a fingerprint of the new workload (generated from the telemetry data of the new workload) can be obtained or generated and compared to a database or library of fingerprints of previous workloads. The best matching fingerprint is identified. The resource allocation associated with the best matching fingerprint is applied or initially allocated to the new workload. By initially allocating resources based on extracted fingerprints, the initial allocation is likely to be closer to the true allocation. This reduces convergence times and helps minimize interference.

Figure 2:
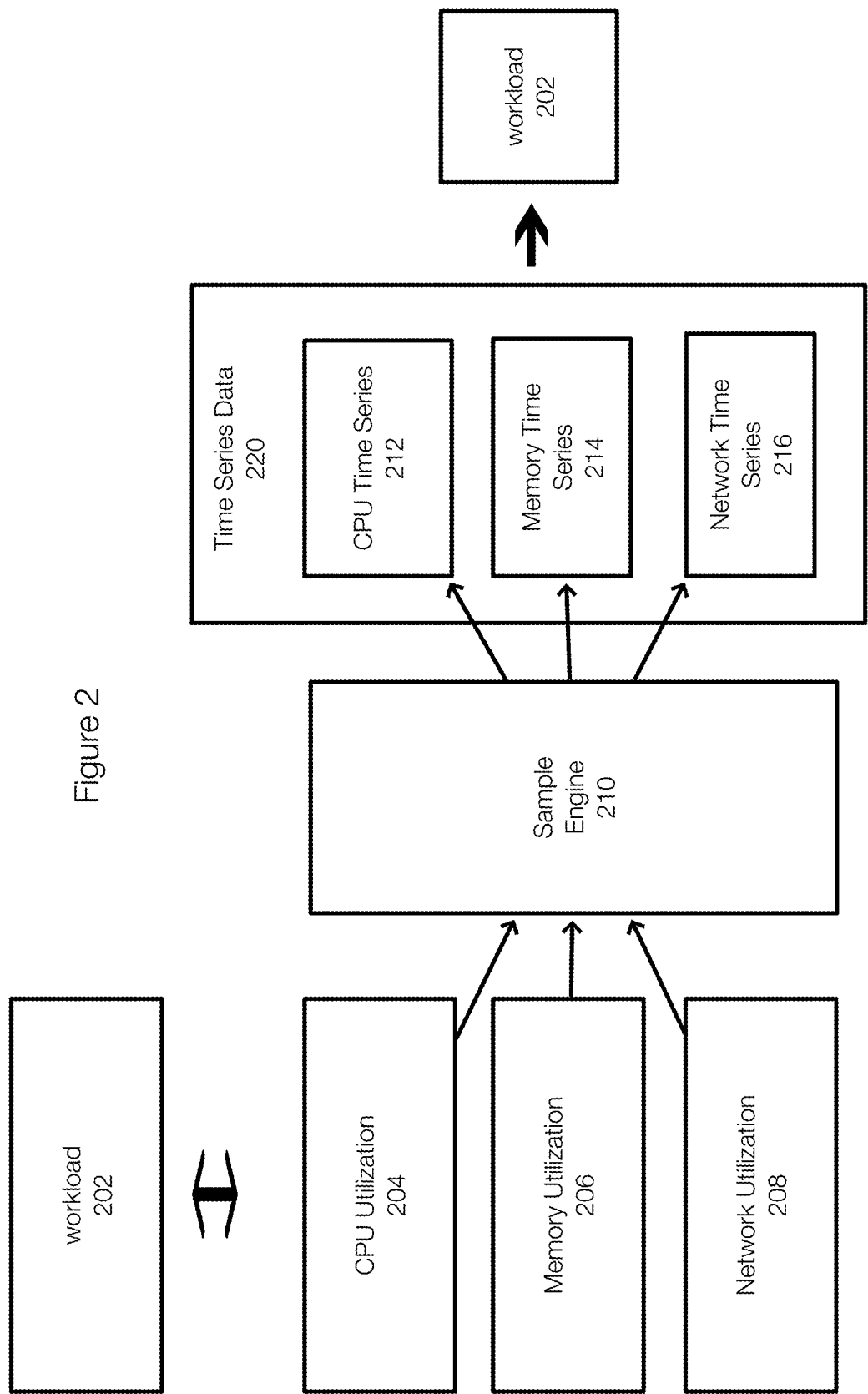
FIG. 2 illustrates an example of telemetry data collection and time series generation for the collected telemetry data.

FIG. 2 illustrates an example of collecting telemetry data. FIG. 2 illustrates a workload 202 that is using resources including CPU (e.g., processors, controllers) utilization 204, memory utilization 206, and network utilization 208. A sample engine 210 is configured to sample the utilizations 204, 206, and 208. In one example, the sample rate is $h_r$. The sample rate may be on the order of milliseconds or another period.

The sample engine 210, by sampling the utilizations 204, 206 and 208, generates telemetry data that includes time series data. The sample engine 210 generates a CPU time series 212, a memory time series 214, and a network time series 216. The time series telemetry data represent how the workload 202 is using the computing resources (e.g., CPU, memory, and network) over time.

The telemetry data can be collected from multiple workloads and the telemetry data can be collected at different granularities.

In this example, CPU utilization 204 is represented by c, memory utilization is represented by m, and network utilization is represented by n. In this example, the set of possible telemetries $\mathbb{M} = \{c, m, n\}$. After collecting these metrics, a set of timestamped observations can be formed.

For each workload execution j, the following time series may be generated:

$$c_j = \{c_j(t_0), c_j(t_0+h_t), \ldots c_j(t_{f_j})\}$$

$$m_j = \{m_j(t_0), m_j(t_0+h_t), \ldots m_j(t_{f_j})\}$$

$$n_j = \{n_j(t_0), n_j(t_0+h_t), \ldots n_j(t_{f_j})\}$$

The time series data, which is collected or generated from the telemetry of multiple workload executions, can be used to generating fingerprints 240. Thus each fingerprint included in the database of fingerprints 240 may correspond to a resource allocation. Further, the fingerprints 240 can be arranged by class. This allows fingerprints from new workloads to be compared to fewer fingerprints (e.g., fingerprints from the same class). However, fingerprints associated with neural network workloads are likely to be more suitable, from the perspective of allocating resources to a new neural network workload, than fingerprints from computer vision workloads. Comparison with all fingerprints is not, however, precluded.

Figure 3:
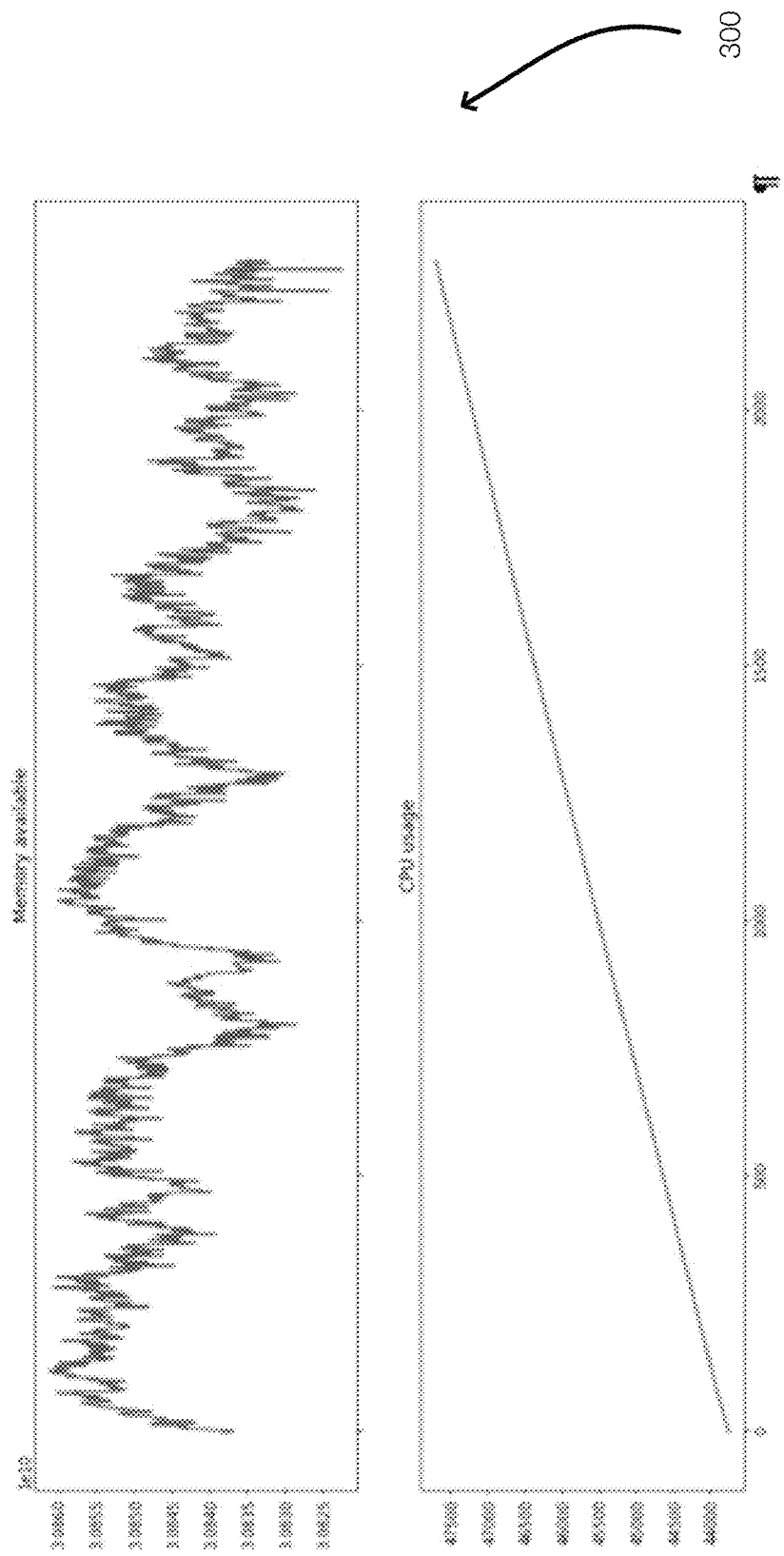
FIG. 3 illustrates an example of time series generated from telemetry data.

FIG. 3 illustrates examples of time series 300 including memory time series and a CPU usage time series. The telemetry data can be collected for workloads. As a result, the amount of telemetry data may continue to increase, although older telemetry data may be deleted. This allows embodiments of the invention to be updated based on more recent telemetry data. This also illustrates that the collected telemetry data may correspond to previously executed workloads. However, some fingerprints may also be generated for the initial stages of running workloads and are, in this sense, historical in nature. More specifically, fingerprints associated with different time periods or windows of telemetry data may be generated regardless of whether the workload is running or has finished executing.

The time series data 220 shown in FIG. 2 allows an autoencoder to be trained per workload class ($w_c$). A workload class, by way of example only, represents a type of workload. For example, neural network workloads may be a workload class, computer vision may be another workload class. Before training an autoencoder, each execution j is assumed to be from a tracked workload of class $w_c$.

After the telemetry data is collected and time series data is generated, an auto encoder may be trained on the time series data. In one example, an autoencoder is an example of a neural network that is configured to regress pieces of data against themselves. Once trained, fingerprints can be extracted from the autoencoder. Thus, the autoencoder is configured to generate fingerprints in one example.

Figure 4:
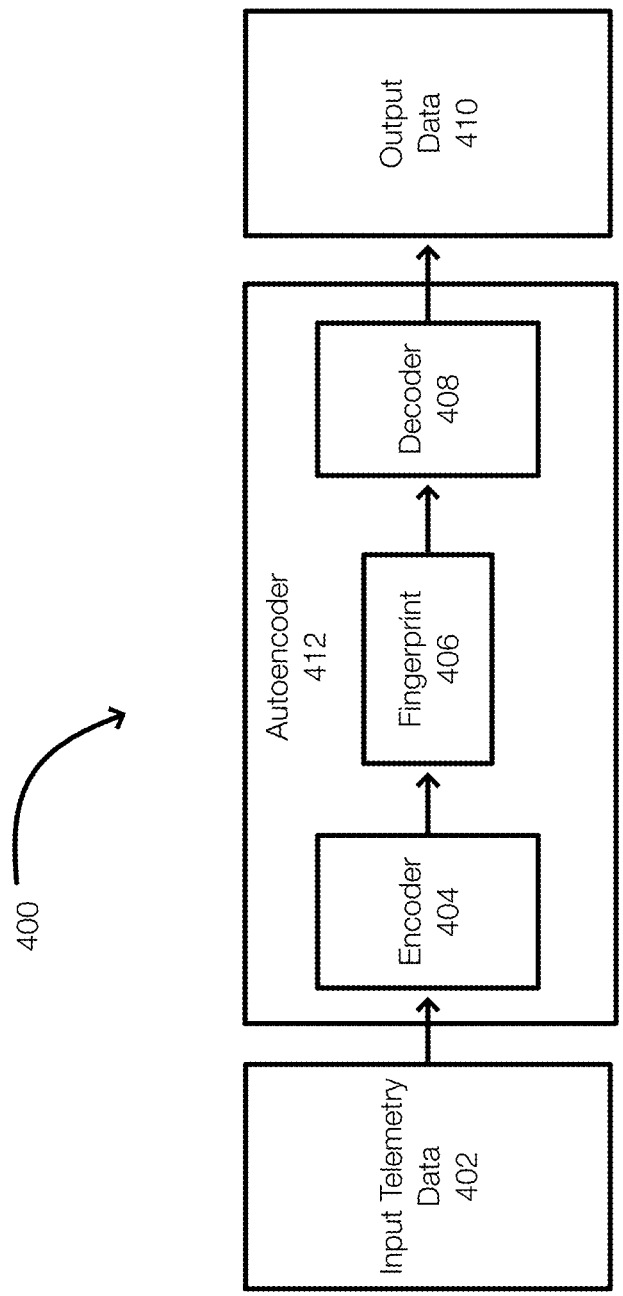
FIG. 4 illustrates an example of an autoencoder that is configured to generate a fingerprint.

FIG. 4 illustrates an example of an autoencoder 400. The objective of the autoencoder 400 is to regress an input X to an output X', reducing the number of features in the central portion. The autoencoder 400 includes an encoder 404, which narrows down the number of features and generates a compact representation of the input, which is illustrated as a fingerprint 406. The autoencoder 400 may include a decoder 408 that upsamples from the fingerprint 406 to generate X', which is as close as possible to X.

Thus, the input telemetry data 402 is input into the encoder 404 and a fingerprint 406 is generated or can be extracted. In effect, the autoencoder 400 allows fingerprints to be extracted from telemetry data 402. When the fingerprint 406 is input into the decoder 408, output data 410 is generated. The goal is to have the output data 410 be equal to or substantially equal to the input telemetry data 402. Once trained, the central portion or the fingerprint 406 can be used in allocating resources to new workloads. In other words, if the fingerprint generated from the telemetry data of a new workload matches (within some threshold) matches the fingerprint of a previous workload, then resources allocated to the new workload can be the same as those that correspond to the previous workload.

More specifically when generating or extracting fingerprints from telemetry data, the input telemetry data 402 can be separated into windows or portions and the portions are used as input into the encoder 404. Thus, a workload may generate multiple fingerprints in one example. A workload may correspond to fingerprints at different points or stages of execution. In one example, the initial allocation of resources is performed by comparing the fingerprints from the initial telemetry data to fingerprints generated from the corresponding initial telemetry data of the previous workloads.

Each of these windows is flattened and fed into the encoder 404 as previously stated. In some embodiments, the windows may have an overlap. In one example, an overlap parameter is defined that may rule or control the manner in which windows are generated. By way of example only, the window parameter ($\mathbb{W}_{w_c}$) is defined as follows:

$$\mathbb{W}_{w_c} = \{[t_0, t_0+N], [t_0+O_{w_c}, t_0+O_{w_c}+N], [t_0+2O_{w_c}, t_0+2O_{w_c}+N], \ldots, [t_f-\tilde{N}, t_f]\}$$

Each window may take a total of $N_{w_c}/h_t$ samples and there are $\|\mathbb{M}\|$ time series in the set. As a result, the input layer of the encoder 404 and the output from the decoder 408 must have a size of $i_{NN} = o_{NN} = \|\mathbb{M}\| \times N_{w_c}/h_t$.

The size of the hidden layers may be defined by multiplying a compression hyperparameter $\gamma$; $0 < \gamma < 1$.

Also $$|l_i| = i_{NN} \times \gamma^i.$$

In this example, $l_i$ is the layer of depth i.
In this example, the autoencoder can be modeled as:

$$X = \phi_{dec}(\phi_{enc}(X)) + \varepsilon.$$

$\phi_{enc}$ is the function modeled by the encoder 404, $\phi_{dec}$ is the function modeled by the decoder 408 and $\varepsilon$ is an error term. If the error term is unknown, the reconstructed series is:

$$X' = \phi_{dec}(\phi_{enc}(X)).$$

Figure 5:
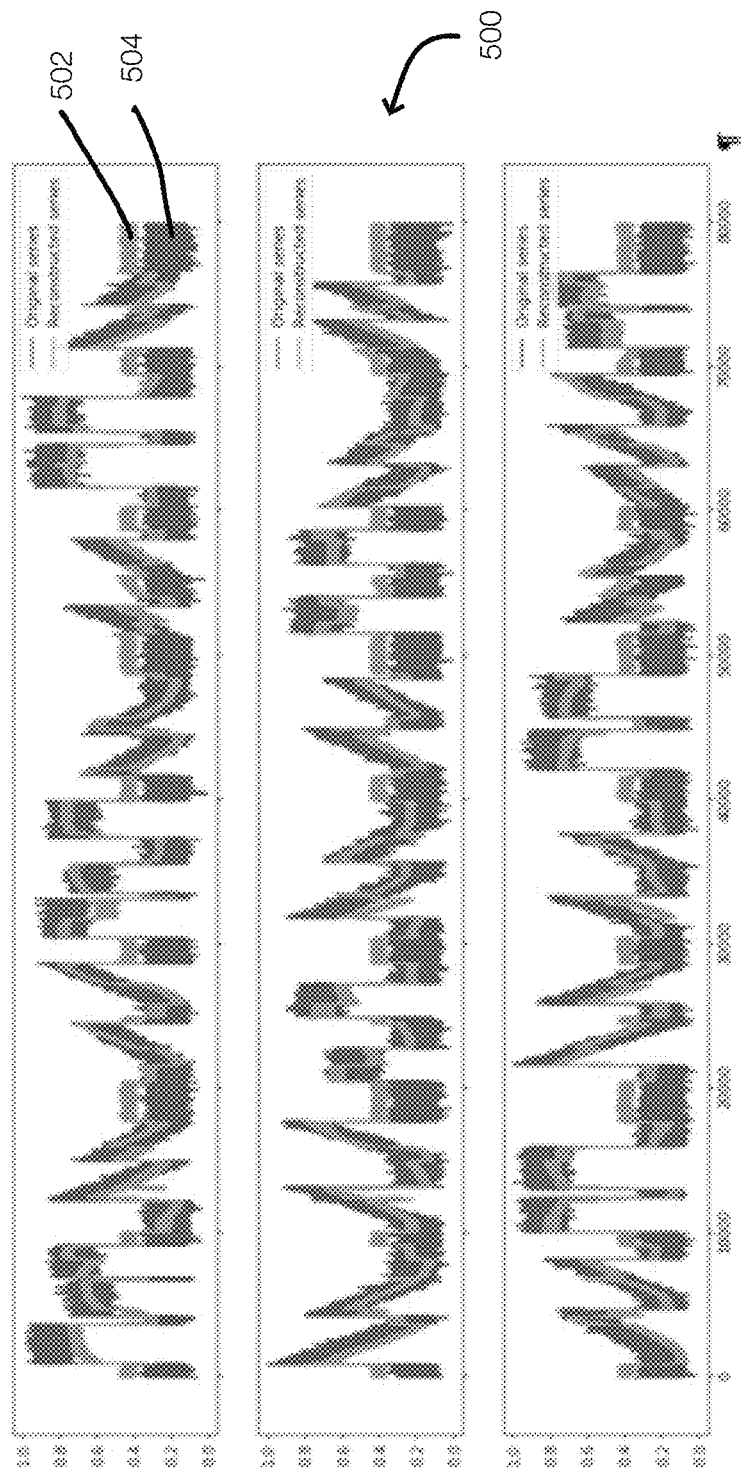
FIG. 5 illustrates and example of the operation of an autoencoder.

FIG. 5 illustrates an example of reconstructed data compared to original data. More specifically, FIG. 5 illustrates a graph 500 that compares original data 504 with reconstructed data 502. In this example, the original data 504 may be input into the autoencoder and encoded and the reconstructed data 502 represents the output of the autoencoder.

Returning to FIG. 4, the autoencoder 412 is configured to extract non-linear relations between the data and compress the data. As a result, the encoded or compressed values, represented as fingerprint 406 can be used as a fingerprint of the execution of a workload. Once the autoencoder 412 is trained, the autoencoder 412 can be persisted along with the amount of resources allocated for the workloads associated with the autoencoder 412.

When resources allocated to a workload are allocated based on the autoencoder 412, the allocation is likely to be closer to the allocation needed to guarantee the SLA compared to a random or equal-share allocation per workload. As a result, the controller convergence time or the time needed to allocate the optimum resources is reduced.

In order to compare a new workload with workloads such as previously stored workloads, embodiments of the invention use workload fingerprints. For example, a window $W_o$ of the telemetry data associated with the new workload is input for an autoencoder $M_k$, which corresponds to the autoencoder trained with telemetry data of the k-th workload in one example. An output is a fingerprint $F_k$. In one example, the fingerprint $F_k$ is a vector with size ($i_{NN} \times \gamma^i$), where $i_{NN}$ is the input size, $\gamma$ is a compression factor and i is a number of encoding layers.

The fingerprint 406 in FIG. 4 is an example of the fingerprint $F_k$. As previously stated, time series data associated with previous workloads have been similarly encoded and windows of the previous workloads are associated fingerprints that are also generated from the autoencoder.

By considering Euclidean distance as a metric for distance between the fingerprints and a given threshold $\tau$, a determination can be made regarding which workload is more similar to the new workload. By taking the allocation associated with the most similar model, the initial allocation of resources can be set for the new workload.

In a case where $\tau$ is not satisfied by any fingerprint, the telemetry data collection phase is started and an autoencoder model is trained and persisted, along with its allocation. This allows a new entry to be made in the model database.

Figure 6:
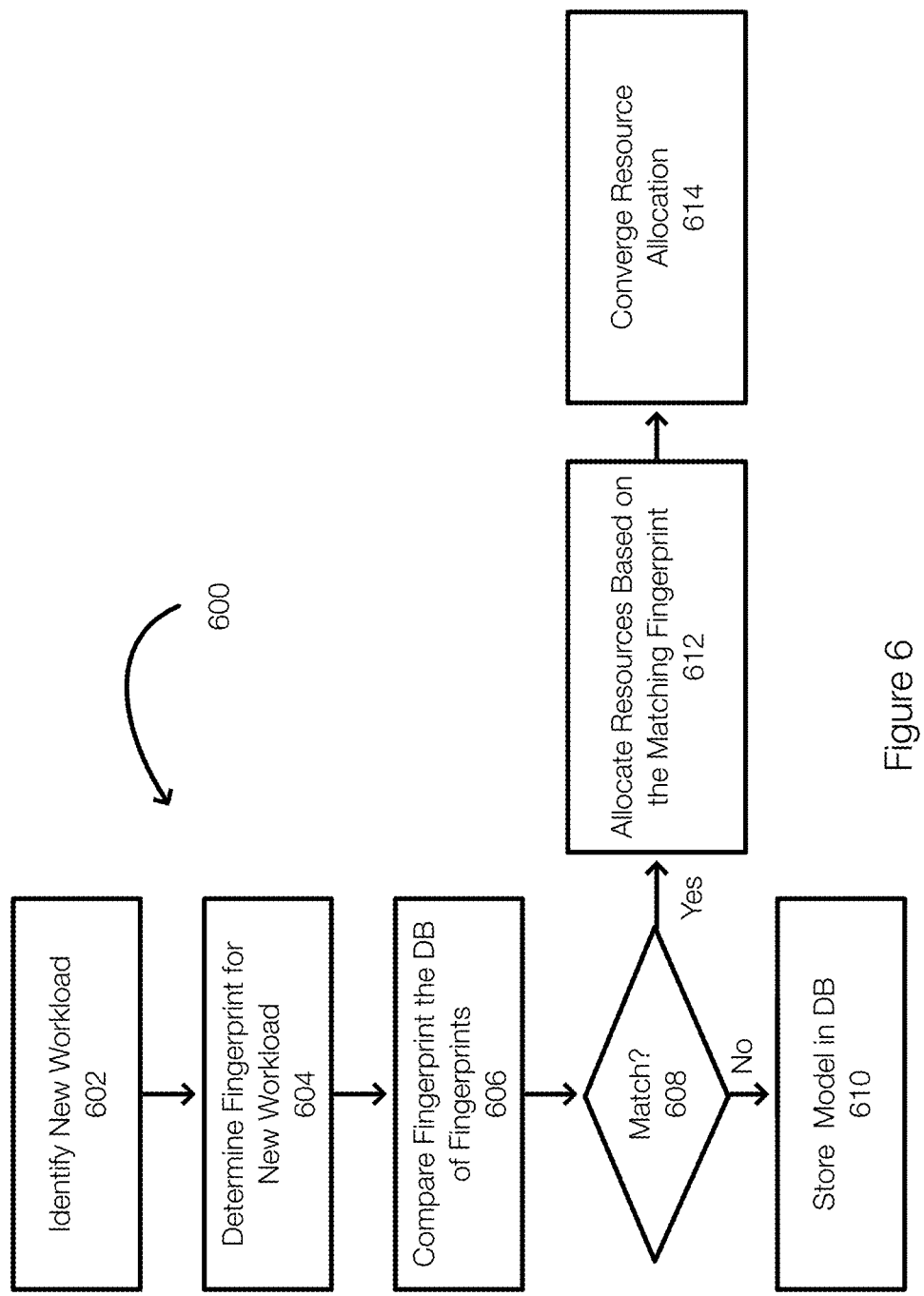
FIG. 6 illustrates an example of a method for allocating resources.

FIG. 6 illustrates an of an architecture for a self-feeding workload for dynamic resource allocation based on telemetry-based fingerprints. A method 600 may begin by identifying 602 a new workload. The workload is typically associated with an SLA and, in one example, the method 600 is performed in order to identify an initial allocation of resources for the new workload.

A fingerprint for the new workload is determined 604. This may include taking telemetry data associated with the new workload and processing the telemetry data using an auto encoder. The fingerprint is then compared 606 with a database of fingerprints. The fingerprints in the database correspond to previous workloads and are associated with resource allocations. In some examples, the associated resource allocations are converged resource allocations.

If a match is found (Yes at 608), between the fingerprint of the workload and a fingerprint in the database, then resources are allocated 612 based on the matching fingerprint. In other words, the resource allocation associated with the matching fingerprint is assigned or are provided to the new workload. The method 600 may then converge 614 the resource allocation. A match is typically found 608 when the newly generated fingerprint is within a threshold distance (e.g., using a Euclidean distance) from a fingerprint in the database.

If a match is not found (No at 608), then a model is stored in the DB for the new workload and may be used for the initial allocation of resources to subsequent workloads.

Figure 7:
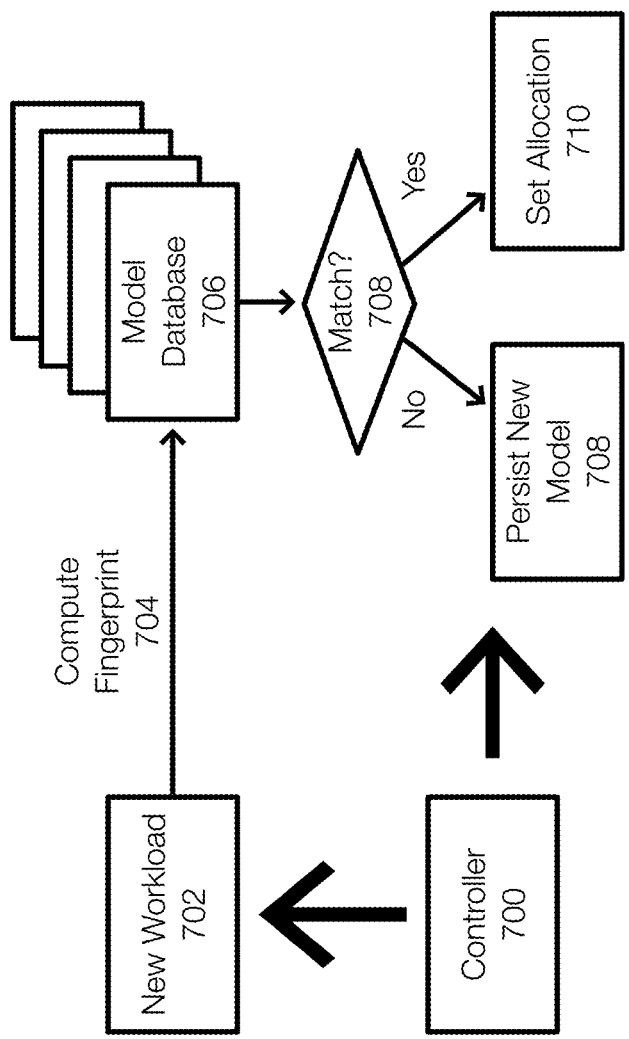
FIG. 7 illustrates an example of a dynamic resource controller configured to determine initial resource allocations for new workloads based on extracted fingerprints and/or dynamically manage existing workloads.

FIG. 7 illustrates an example of a controller 700 (e.g., a processor, computer, virtual machine, server, or the like) that is configured to perform or determine the initial allocation of resources to new workloads and/or converge resources of existing workloads. This process may begin when the controller 700 identifies or receives a new workload 702.

The controller 700 has access to a model database 706. In this example, the model database may store k models and associated resource allocations represented as $\{\alpha, \beta \ldots \omega\}$. The models may be represented as $M_1, \{\alpha, \beta \ldots \omega\}_1 \ldots M_k \{\alpha, \beta \ldots \omega\}_k$. The controller 700 may then compute a fingerprint of the new workload $F_k$ under or using a model $M_i$. In one example, a fingerprint of the new workload is generated under each of the models in the database 706. If there is a match (e.g., when the Euclidean distance of the new workload's fingerprint is within a threshold of a fingerprint associated with a model in the database), then the new workload 702 is set with the same allocation 710. Otherwise, a new model $M_{k+1}$ is persisted 708 in the database 706.

The initial allocation of resources to a new workload, given the SLA, the workload features, and the target infrastructure, can be determined using fingerprints and fingerprint extraction as discussed herein. By providing an initial allocation that is good, the SLA is less likely to be infringed and resources are allocated appropriately (e.g., not over or under allocated).

Embodiments of the invention further relate to managing workloads. For example, if a system has 100 resource units (e.g., RAM MBs) equally divided by 10 workloads, each workload will receive 10 MBs. If a new workload is started, the new workload will have to wait until one of the current workloads is finished. In addition, the new workload will only receive 10 MB of RAM. This type of equal-share resource allocation is inadequate.

Embodiments of the invention, in contrast, provide a good initial estimate of resources to allocate and, after the initial allocation, continues to dynamically control the amount of allocated resources while considering the interference of other workloads as previously described.

Embodiments of the invention further reduce the time to convergence. Starting a workload with a better estimate or a more accurate resource allocation is useful because, when considering workloads and SLA requirements, errors at the beginning of an execution are just as important as errors that occur later. More specifically, Integral of Time Absolute Error (ITAE) is a standard in error metrics for dynamic control situations. However, this often penalizes errors at the end of the execution more heavily. Embodiments of the invention may rely on a percentage of time within n % error as a metric. In one example, this error metric may relate to a stability analysis and reflects how the execution time of the workloads diverge from the corresponding set points. Thus, this error may guide the controller through set-point setting for at SLA. For example, for a given confidence threshold (e.g., 95%), how much to deviate from the SLA when setting the set-point can be determined in order to be compliant.

As previously stated, a parameter that relates to self-allocation $b_{1i}$ and a parameter that relates to interference caused by other workloads $b_{2i}$ can be determined or estimated. The interference parameter can also be used in conjunction with embodiments of the invention to avoid interference effects when a new workload is deployed.

For example, assume that two workloads are already running and they are with current allocations (a): $a_1=3.1$ cores and $a_2=2.4$ cores. These workloads have current interference parameter estimates of $b_{21}=0.05$ and $b_{22}=0.025$.

If a third or new workload needs to be deployed and its current estimation model, based on an extracted fingerprint, give a recommendation $a_3=4.4$ cores, the quantities for $\Delta a_1$ and $\Delta a_2$ can be preemptively increased as follows before the new workload executes:

$\Delta a_1 = 4.4 * 0.5 = 0.22$ and $\Delta a_2 = 4.4 * 0.025 = 0.11$.

This will prevent the new workload from disrupting the execution of the first two workloads even before interference occurs. In other words, new workloads may impact the allocations of already running workloads. To mitigate this impact, embodiments of the invention preemptively adjust the allocations of the workloads that are running before starting the new workload.

In addition, this helps prevent workloads that have already converged from leaving a convergence band. As a result, the number of workloads that can be controlled at once can be increased. In addition, the controller mechanism can be deployed as a continuously-running process. This allows the controller to adapt the resource allocations of newly deployed workloads and account for the interference they may cause on existing workloads that are already running.

An experiment was conducted to evaluate the ability to determine initial resource allocations based on autoencoder-based extracted fingerprints. In this experiment, two workloads were executed and their telemetry data was collected. In this experiment, in order to evaluate the feasibility of the autoencoder-based fingerprint extraction, we executed two workloads collecting their telemetry data. The first workload, $M_1$, was a computer vision algorithm for lane detection in the context of connected vehicles. The second workload, $M_2$, was a neural network applied in the context of handwriting recognition.

The telemetry data for these workloads included memory and CPU. Once the telemetry data was collected, the corresponding autoencoders were trained for each workload. Next, fingerprints $F_1$ and $F_2$ are generated. In this example, the fingerprints $F_1$ and $F_2$ correspond to the first 10 seconds of the corresponding workloads $M_1$ and $M_2$.

Next, a new workload, also based on lane detection but with a different input was executed and the telemetry data for the first 10 seconds was captured. The fingerprint candidate to the first model $F_{M_k}$, corresponds to the fingerprint generated from the telemetry data of the new workload execution inferred under the k-th model of the database and so on. In this example, $F_1$ was compared to $F_{M_1}$ and $F_2$ was compared to $F_{M_2}$.

Figure 8:
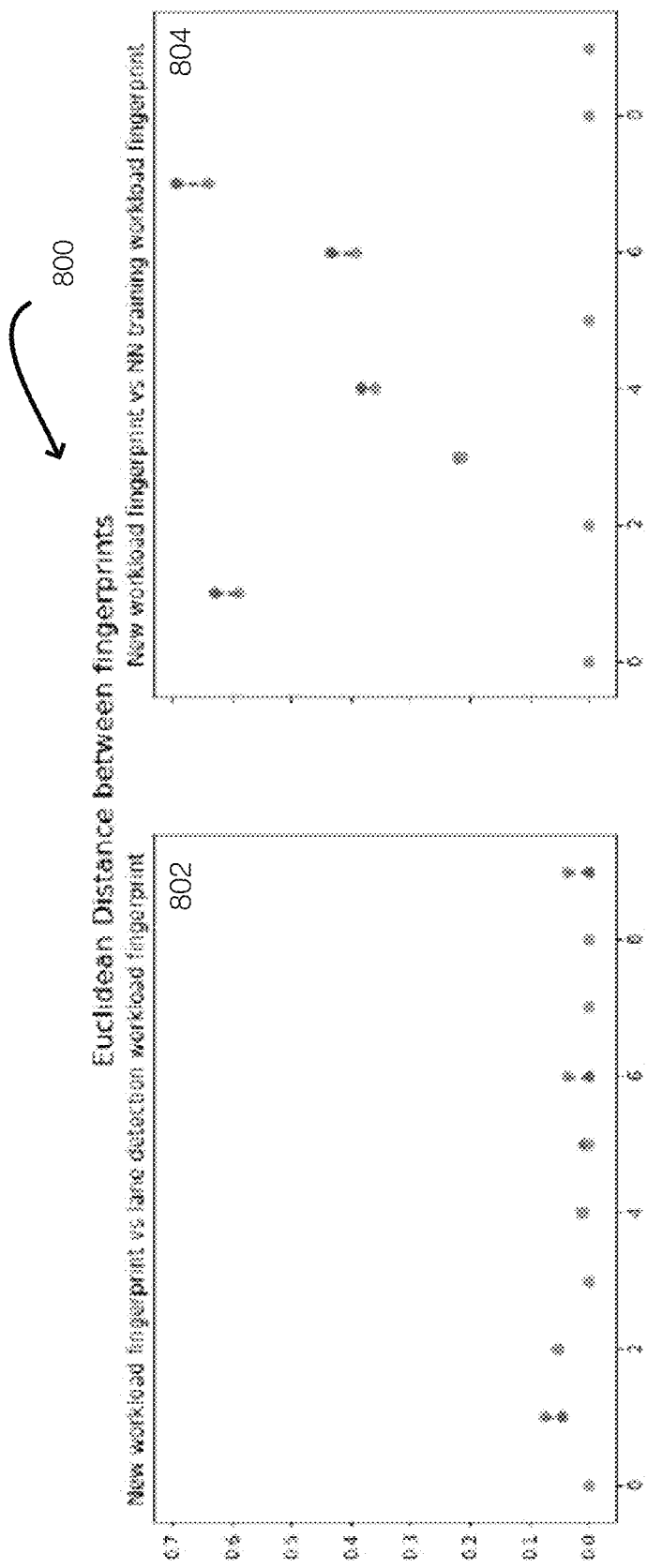
FIG. 8 illustrates an example of fingerprint comparisons between a new workload and previous workload executions.

FIG. 8 illustrates the distances (e.g., Euclidean distance) between the fingerprints. The graph 800 includes a plot 802 that compares the fingerprint of the new workload to the fingerprint of the lane detection workload $M_1$ and the plot 804 compares the fingerprint of the new workload to the fingerprint of the NN training workload $M_2$.

In this example, the distance in the plot 802 is smaller than the distance shown in the plot 804. This is expected because the new workload is the same as the workload $M_1$, but with different input. As a result, the new workload would be set to be the same as the allocation associated with the workload $M_1$.

Embodiments of the invention thus relate to the initial estimation of resource allocation based on a fingerprint that is extracted from the execution itself. By considering features of the telemetry data collected from the execution of an iterative workload, the model that is persisted in a database and that is most similar to the workload being evaluated can be identified. Because a resource allocation is associated with each model, the resource allocation associated with the most similar model can be allocated to the new workload. This reduces resource wasting, which may impact other running workloads in the same infrastructure as interference and may cause SLE infringement.

New observations can be stored and a heuristic can be used to determine which of the available models should be used or whether a new model should be generated. In addition, models can be refreshed or retrained (e.g., using newer telemetry data input) when drifting or decaying accuracy is observed.

Embodiments of the invention also enable faster learning of interference in dynamic resource allocation. By improving the initial estimate of resource allocation for a new workload, small various of resources are caused (particularly during the first control iterations as the allocation converges. Smaller variations imply smaller variations in the interference between workloads. This further facilitates the ability to learn the interference parameters by dynamic resource allocation controllers.

Embodiments of the invention also provide faster convergence for controller based dynamic resource allocation. Control algorithms offer various advantages and guarantees such as stability, resilience to disturbances, and tracking. Information from workload iterations can be used to detect and remove these workloads from the control cycle. Embodiments of the invention further accelerate the convergence of all workloads at least because the initial resource allocation estimate should be comparatively closer to the set point, assuming that the set point considers the infrastructure and SLA feasibility.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, resource allocation operations, resource allocation estimation operations, fingerprint extraction operations, and other operations. Example workloads include neural networks, data protection, computer vision, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method for allocating resources, the method comprising: generating a fingerprint from telemetry data associated with an execution for a new workload using an autoencoder, comparing the fingerprint of the new workload to fingerprints associated with previously executed workloads, identifying a match between the fingerprint of the new workload and a fingerprint of a previous workload from the comparisons, and allocating resources to the new workload that correspond to resources allocated to the previous workload.

Embodiment 2. The method of embodiment 1, wherein the allocation of resources to the new workload is an initial allocation of the resources.

Embodiment 3. The method of embodiment 1 and/or 2, further comprising converging the resources of the new workload and other running workloads such that the resources allocated to the new workload allow compliance with a services level agreement.

Embodiment 4. The method of embodiment 1, 2, and/or 3, wherein the telemetry data used in generating the fingerprint of the new workload is generated from an initial portion of the telemetry data that corresponds to a period of time at a beginning of an execution of the new workload.

Embodiment 5. The method of embodiment 1, 2, 3, and/or 4, wherein the period of time is predetermined.

Embodiment 6. The method of embodiment 1, 2, 3, 4, and/or 5, wherein the autoencoder has been trained using telemetry data from the previous workloads.

Embodiment 7. The method of embodiment 1, 2, 3, 4, 5, and/or 6, further comprising generating a new autoencoder based on the new workload when no match to the fingerprint of the new workload is found.

Embodiment 8. The method of embodiment 1, 2, 3, 4, 5, 6, and/or 7, further comprising collecting telemetry data from a plurality of workloads.

Embodiment 9. The method of embodiment 1, 2, 3, 4, 5, 6, 7, and/or 8, further comprising training a plurality of models corresponding to a plurality of workloads and generating a plurality of fingerprints for each of the plurality of workloads.

Embodiment 10. The method of embodiment 1, 2, 3, 4, 5, 6, 7, 8, and/or 9, wherein the telemetry data includes at least one of CPU usage, memory usage, and/or network usage.

Embodiment 11. The method of embodiment 1, 2, 3, 4, 5, 6, 7, 8, 9, and/or 10, further comprising generating time series data for the telemetry data.

Embodiment 12. The method of embodiment 1, 2, 3, 4, 5, 6, 7, 9, 10, and/or 11, further comprising adjusting the resources allocated to the new workload based on the allocated resources, interference from other workloads, and a metric of interest.

Embodiment 13. The method of embodiment 1, 2, 3, 4, 5, 6, 7, 8, 9, 10, 11, and/or 12, further comprising allocating resources to comply with a given SLA and account for features of the new workload, and an infrastructure in which the new workload and other workloads concurrently run.

Embodiment 14. The method of embodiment 1, 2, 3, 4, 5, 6, 7, 9, 10, 11, 12, and/or 13, wherein the autoencoder is trained by regressing data against itself such that an output of the autoencoder is similar to an input to the autoencoder.

Embodiment 15. The method of embodiment 1, 2, 3, 4, 5, 6, 7, 9, 10, 11, 12, 13, and/or 14, wherein comparing is performed based on features of the fingerprint and a distance between features of the fingerprint to features of the fingerprints from the previous workloads, wherein a match is determined when the distance is within a threshold distance.

Embodiment 16. The method of embodiment 1, 2, 3, 4, 5, 6, 7, 9, 10, 11, 12, 13, 14, and/or 15, further comprising training an autoencoder per class of workload.

Embodiment 17. The method of embodiment 1, 2, 3, 4, 5, 6, 7, 9, 10, 11, 12, 13, 14, 15, and/or 16, further comprising: collecting telemetry data from workloads; generating time series of telemetry data; dividing the time series of telemetry data into windows; and generating fingerprints for each of the workloads from each of the windows.

Embodiment 18. The method of embodiment 1, 2, 3, 4, 5, 6, 7, 9, 10, 11, 12, 13, 14, 15, 16, and/or 17, further comprising converging the workloads, wherein workloads that have converged are monitored and when an error of monitored workloads exceeds a threshold, the monitored workloads are actively controlled to converge the workloads.

Embodiment 19. The method as recited in any one or more of embodiments 1 to 18 or portions thereof.

Embodiment 20. A non-transitory storage medium having stored therein instructions that are executable by one or more hardware processors to perform the operations of any one or more of embodiments 1 through 19 or portions thereof.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device, a virtual device, or the like. As well, where any of the aforementioned elements comprise or consist of a virtual machine (VM), that VM may constitute a virtualization of any combination of the physical components herein.

In one example, the physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for allocating resources, the method comprising:
    generating a fingerprint from telemetry data associated with an execution for a new workload using an autoencoder;
    comparing the fingerprint of the new workload to fingerprints associated with previously executed workloads;
    identifying a closest match between the fingerprint of the new workload and a fingerprint of a previous workload from the comparisons;
    allocating resources to the new workload that correspond to resources allocated to the previous workload; and
    converging the resources allocated to the new workload and resources allocated to running workloads based on an error metric for the new workload and an error metric for each of the running workloads, wherein converging includes adjusting the resources allocated to the new workload and the resources allocated to the running workloads based on the error metrics.

2. The method of claim 1, wherein the allocation of resources to the new workload is an initial allocation of the resources.

3. The method of claim 2, further comprising converging the resources of the new workload and other running workloads such that the resources allocated to the new workload allow compliance with a services level agreement.

4. The method of claim 1, wherein the telemetry data used in generating the fingerprint of the new workload is generated from an initial portion of the telemetry data that corresponds to a period of time at a beginning of an execution of the new workload.

5. The method of claim 4, wherein the period of time is predetermined.

6. The method of claim 1, wherein the autoencoder has been trained using telemetry data from the previous workloads.

7. The method of claim 1, further comprising generating a new autoencoder based on the new workload when no match to the fingerprint of the new workload is found.

8. The method of claim 1, further comprising collecting telemetry data from a plurality of workloads.

9. The method of claim 8, further comprising training a plurality of models corresponding to a plurality of workloads and generating a plurality of fingerprints for each of the plurality of workloads.

10. The method of claim 1, wherein the telemetry data includes at least one of CPU usage, memory usage, and/or network usage.

11. The method of claim 10, further comprising generating time series data for the telemetry data.

12. The method of claim 1, further comprising adjusting the resources allocated to the new workload based on the allocated resources, interference from other workloads, and a metric of interest.

13. The method of claim 1 further comprising allocating resources to comply with a given SLA and account for features of the new workload, and an infrastructure in which the new workload and other workloads concurrently run.

14. The method of claim 1, wherein the autoencoder is trained by regressing data against itself such that an output of the autoencoder is similar to an input to the autoencoder.

15. The method of claim 1, wherein comparing is performed based on features of the fingerprint and a distance between features of the fingerprint to features of the fingerprints from the previous workloads, wherein a match is determined when the distance is within a threshold distance.

16. The method of claim 1, further comprising training an autoencoder per class of workload.

17. The method of claim 15, further comprising: collecting telemetry data from workloads; generating time series of telemetry data; dividing the time series of telemetry data into windows; and generating fingerprints for each of the workloads from each of the windows.

18. The method of claim 1, further comprising converging the workloads, wherein workloads that have converged are monitored and when an error of monitored workloads exceeds a threshold, the monitored workloads are actively controlled to converge the workloads.

19. A non-transitory computer readable storage comprising executable instructions for performing operations comprising:
   generating a fingerprint from telemetry data associated with an execution for a new workload using an autoencoder;
   comparing the fingerprint of the new workload to fingerprints associated with previously executed workloads;
   identifying a closest match between the fingerprint of the new workload and a fingerprint of a previous workload from the comparisons;
   allocating resources to the new workload that correspond to resources allocated to the previous workload;
   allocating resources to the new workload that correspond to resources allocated to the previous workload; and
   converging the resources allocated to the new workload and resources allocated to running workloads based on an error metric for the new workload and an error metric for each of the running workloads, wherein converging includes adjusting the resources allocated to the new workload and the resources allocated to the running workloads based on the error metrics.

20. The non-transitory computer readable storage of claim 19, the operations further comprising converging the resources for the new workload and other workloads by considering an SLA, an infrastructure, interference, and allocated resources to the new workload.

* * * * *